US010215589B2

(12) United States Patent
Sterling

(10) Patent No.: US 10,215,589 B2
(45) Date of Patent: Feb. 26, 2019

(54) IO MATCHING CURRENT MODULATED OUTPUT FOR SENSORS

(71) Applicant: Infineon Technologies AG, Neubiberg (DE)

(72) Inventor: James William Sterling, Novi, MI (US)

(73) Assignee: Infineon Technologies AG, Neubiberg (DE)

(*) Notice: Subject to any disclaimer, the term of this patent is extended or adjusted under 35 U.S.C. 154(b) by 328 days.

(21) Appl. No.: 14/824,568

(22) Filed: Aug. 12, 2015

(65) Prior Publication Data

US 2017/0045546 A1 Feb. 16, 2017

(51) Int. Cl.
*G01D 5/14* (2006.01)
*G01P 3/487* (2006.01)

(52) U.S. Cl.
CPC ............. *G01D 5/142* (2013.01); *G01P 3/487* (2013.01)

(58) Field of Classification Search
CPC . G01D 5/142; G01P 3/487; G01P 3/46; G01P 3/465; G01P 3/48; G01P 3/4802; G01P 3/4805; G01P 3/4807; G01P 3/481; G01P 3/488; G01P 3/489; G01R 31/318572; H01L 27/11898
USPC ......... 324/756.06, 160–180, 207.13, 207.15, 324/207.2–207.26; 326/30, 63–87, 31; 327/333, 437
See application file for complete search history.

(56) References Cited

U.S. PATENT DOCUMENTS

| | | | | | |
|---|---|---|---|---|---|
| 5,422,568 A | * | 6/1995 | Hashizume | ............. | G01P 3/487 324/166 |
| 5,446,397 A | * | 8/1995 | Yotsuyanagi | ........ | H03K 5/2472 323/315 |
| 5,541,531 A | * | 7/1996 | Kultgen | ................. | G01R 19/00 326/62 |
| 5,936,429 A | * | 8/1999 | Tomita | ................... | H03K 5/153 326/26 |
| 6,249,621 B1 | * | 6/2001 | Sargent, IV | ..... | G01R 31/31905 324/72.5 |
| 7,913,547 B2 | * | 3/2011 | Iwata | .................... | G01P 3/4807 73/114.25 |

(Continued)

FOREIGN PATENT DOCUMENTS

CN  202815626 U  3/2013

OTHER PUBLICATIONS

"Protecting Inputs in Digital Electronics." Solutions Cubed. Digi-Key Corporation, Mar. 17, 2015, pp. 1-8.

(Continued)

*Primary Examiner* — Jeff W Natalini
*Assistant Examiner* — Steven L Yeninas
(74) *Attorney, Agent, or Firm* — Eschweiler & Potashnik, LLC

(57) ABSTRACT

A sensor system enables a direct communication from a current modulated two-wire sensor or a speed sensor module to a TTL or CMOS processor. A magnetic speed sensor provides a current modulated signal directly to an input/output (I/O) pin of the TTL or CMOS processor, which is able to read TTL or CMOS levels of I/O signals thereat. A current to voltage converter converts the current modulate signal to a voltage modulated signal as an I/O signal that is directly read by the TTL or CMOS processor without additional components or elements.

20 Claims, 6 Drawing Sheets

(56) References Cited

U.S. PATENT DOCUMENTS

| | | | |
|---|---|---|---|
| 2011/0122539 A1* | 5/2011 | Mann | H03K 19/00315 |
| | | | 361/91.5 |
| 2011/0238135 A1* | 9/2011 | Marnfeldt | A61N 1/32 |
| | | | 607/59 |
| 2011/0304847 A1* | 12/2011 | Mahowald | G01J 1/32 |
| | | | 356/218 |

OTHER PUBLICATIONS

"Digital I/O Connections." Mosaic Industries, Inc. 3 pages.
"Xtra-Guard 2—Abrasion Resistant Control Cable." Science Prog, Mar. 17, 2015, pp. 1-10.

* cited by examiner

302 — TTL

| Supply Limits | Min | Max | Average | Matching Resistor | Output (mA) | Min Output (mA) +10% | Max Output (mA) -10% | Recommended (mA) |
|---|---|---|---|---|---|---|---|---|
| | | | | | | 110 | 90 | 24 |
| | | | | | | 110 | 90 | 6 |
| MCU Vin(H) | 2 | 5.5 | 3.75 | 100 | 37.50 | 22.22 | 61.11 | |
| MCU Vin(L) | 0 | 0.8 | 0.4 | 100 | 4.00 | 0.00 | 7.27 | |

304 — CMOS

| Supply Limits | Min | Max | Average | Matching Resistor | Output (mA) | Min Output (mA) +10% | Max Output (mA) -10% | Recommended (mA) |
|---|---|---|---|---|---|---|---|---|
| | | | | | | | | 24 |
| | | | | | | | | 6 |
| MCU Vin(H) | 3.00015 | 5.5 | 4.250075 | 180.0736739 | 23.60 | 198.0810413 | 162.0663065 | |
| | | | | 180.0879237 | | 198.0967161 | 162.0791314 | |
| MCU Vin(L) | 0 | 1.83315 | 0.916575 | | 5.09 | 18.51 | 27.76 | |
| | | | | | | 0.00 | 9.25 | |

FIG. 3

Logic Level Examples

| Technology | L voltage | H voltage | Notes |
|---|---|---|---|
| CMOS | 0 V to 1/3 $V_{DD}$ | 2/3 $V_{DD}$ to $V_{DD}$ | $V_{DD}$ = supply voltage |
| TTL | 0 V to 0.8V | 2V to $V_{CC}$ | $V_{CC}$ = 5 V ±10% |

(12) United States Patent
US 10,215,589 B2

IO MATCHING CURRENT MODULATED OUTPUT FOR SENSORS

BACKGROUND

Inputs to electronic systems are generally controlled by an end user. The inputs are read by electronic components and processed into various outputs. These inputs can come from a variety of sources, such as buttons, switches, sensors, relays, or other sources, to just name a few. However, the input signals could further go unread without being in a format that is required by the input/output interface of a component. In addition, in certain architectures, these input signals can be a threat to the electronics reading them. For example, components designed without protection could be damaged in cases where the electronic components (e.g., processors, microcontrollers or the like) are not designed with safety control or protection in consideration. An important aspect of architectures for industrial environments, for example, is interfacing sensitive electronics with inputs coming from the harsh conditions of a factory floor. Inputs are usually read by some sort of intelligent processor such as a microcontroller, FPGA, state machine or similar processing component. In cases like these, as well as other communication systems with interfacing between components, it is imperative to protect the processor from the inputs, while still providing a usable signal for the processor to read.

Although conventional input/output (I/O) techniques are sufficient in some instances, they are less than ideal in other cases. For instance, in previous I/O solutions, multiple different devices or components are often utilized to change the interface (e.g., current interface) and match the I/O input so that the output of a device communicating with a microcontroller is within established limits of an I/O channel. These components can include one or more diodes, comparators, or other components in combination, for example. Because of this, improved techniques for generating and measuring I/O signals are disclosed.

BRIEF SUMMARY

The invention is set forth in the appended claims. Nothing in this summary should be construed to limit the scope of the appended claims.

DESCRIPTION OF THE DRAWINGS

FIG. 3 is a data set illustrating specifications of a sensor system in accordance with one or more embodiments.

DETAILED DESCRIPTION

Figure 1:
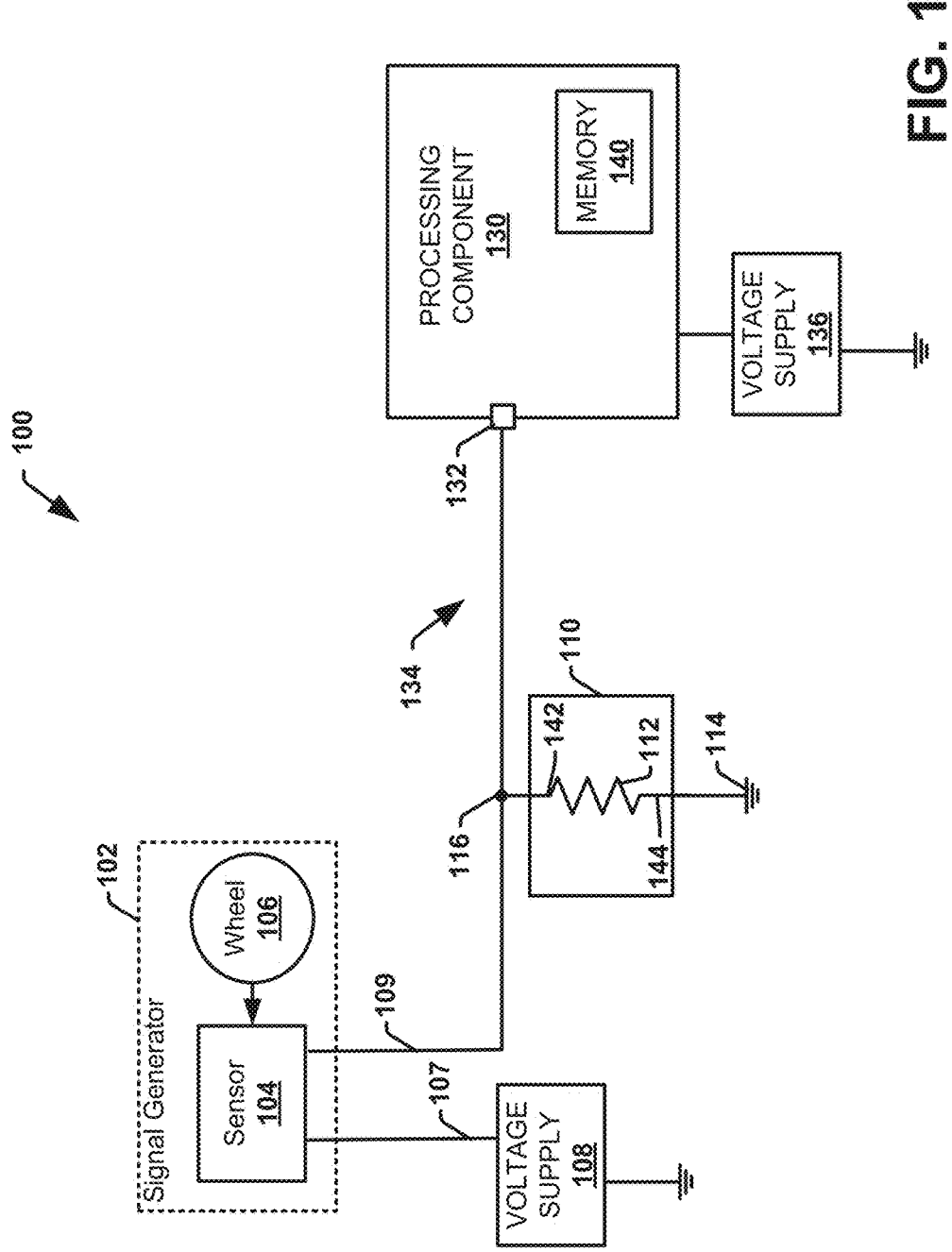
FIG. 1 is a block diagram illustrating a sensor system in accordance with one or more embodiments.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, an electronic circuit, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors or controllers. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

Some embodiments of the present disclosure relate to matching I/O levels of a sensor signal to a processing component, which can be a processor, a microcontroller, a control unit, digital signal processor, a field-programmable gate array, state machine or other control device. The sensor system comprises a magnetic sensor that detects a physical property (e.g., a magnetic property or other physical property) and is directly connected to the processing component. The magnetic sensor outputs a current modulated two-wire signal having sensor data related to the physical property to the processing component via a direct I/O connection between the sensor and an I/O pin of the processing component.

A current to voltage converter comprising a load resistor is connected to the direct I/O channel connection at a single connect node (tap or point) along the direct I/O connection. The resistor operates to convert the current modulated signal from the sensor to a voltage modulated signal comprising the signal data. The load resistor directly provides the voltage modulated signal to the I/O pin and thus operates as a current to voltage converter and a current limiting resistor.

The processing component receives the voltage modulated signal having the sensor data from the sensor and reads I/O levels in signal oscillations from the current modulated signal. The I/O levels are matched to the levels with complementary metal-oxide semiconductor (CMOS) levels or transistor-to-transistor logic (TTL) levels that are associated with the processing component to enable direct reading and processing without additional manipulation or further components. The processing component can thus directly receive the sensor data from the sensor safely and without further manipulation on the processor chip or board or within the I/O connection to the sensor. The processing component then processes sensor data related to the physical property from the I/O levels without further manipulation or additional components being used to modify these I/O levels, which are being directly received at the I/O pin of the processing component or processor.

Referring to FIG. 1, illustrated is an example sensor system in accordance with various aspects. The sensor system 100 comprises a sensor generator 102 coupled to a voltage to current converter 110 and a processing component 130. The sensor generator 102 includes a sensor 104 (e.g., a wheel sensor, a speed sensor, anti-lock brake sensor, a current modulated sensor, a Hall sensor, a tunnel magnetoresistance (TMR) sensor, a magnetoresistive (MR) sensor, a giant magnetoresistance (GMR) sensor, or other type sensor) that detects a physical property to measure sensor data and provide it directly to the processing component 130 without further modification of the sensor data.

The sensor 104, for example, is configured to generate a current modulated output signal as an oscillating time-varying waveform having sensor data based on a physical property being sensed by the sensor from a wheel 106 (e.g., a wheel speed). The sensor 104 can be a two-wired sensor that comprises a first wire 107 connected to a voltage supply 108 and a second wire 109, or I/O connection connected to the processing component 130. The sensor 104 is further connected to the current to voltage converter 110, which converts the current modulated output signal from the sensor 104 to a voltage modulated signal having the sensor data. The processing component 130 monitors the voltage modulated signal directly at the I/O interface 132 without additional components for additional modification or matching of the current modulated output signal from the sensor 104. The processing component 130 can thus directly read the voltage modulated signal thereat via a direct connection (e.g., the second wire 109) to the I/O interface 132.

During operation, a memory 140 can store a number of operating instructions (e.g., software or firmware instructions), which can be retrieved and executed by the processing component 130. These instructions can cause the processing component 130 to write to the memory 140, which can then enable the processing component 130 to monitor an I/O signal 134 having the sensor data of the current modulated output signal from the sensor 104 on the I/O interface 132. For example, the high and low levels of the voltage modulated signal matches the specified levels for an I/O signal 134 at the I/O interface 132 to be detected by the processing component 130. The I/O signal 134 is then able to be detected and safely processed by the processor component 130 by being within the specified communication protocol of the processing component 130, which detects the sensor data directly from the I/O interface 132 in the voltage modulated signal. The I/O interface 132 can also further comprise an I/O pin or an I/O terminal, which is associated with a specific communication protocol having specific logic levels within a range in order for the processing component 130 to read and process the I/O signal 134.

As discussed above, the processing component 130 can be a microcontroller, a controller, a programmable gate array or the like. The processing component 130 can operate as a microcontroller or processor that is supplied by the voltage supply 136 to operate at 5 V, a 3.3 V supply. The processing component 130 can be a CMOS chip or a TTL chip that has a specific protocol related to particular logic levels (e.g., TTL levels or CMOS levels) within a high and a low range for a current modulated output signal to be within a compatible range of a voltage mean signal output for the processing chip.

In one embodiment, the TTL levels of a TTL chip as the processing component 130 can have an input low level among its logic switching levels that is from about 0 V to about 0.8 V, and an input high level among its logic switching levels from about 2 V to about 5 V. CMOS levels can have an input low level from zero to about a third of the supply voltage (e.g., 5 V, 3.3 V or other voltage) and an input high level of about two thirds of the supply voltage to the supply voltage itself. The sensor 104 can operate to directly provide both CMOS and TTL levels to the processing component 130.

In another embodiment, the high and lows of the range can correspond to a fraction of a supply voltage 136 that independently powers the processing component 130. The sensor 104 provides the current modulated output signal having the sensor data directly to the processing as the I/O signal 134, which oscillates within the logic levels that enable the processing component 130 to read the sensor data detected at the I/O interface 132. The range of the logical levels for the I/O signal 134 can have a low and a high magnitude that comprises a 1 to 4 ratio, or a 1 to 4 magnitude ratio. For example, the current modulated output signal from the sensor 104 or the voltage modulated signal generated by the resistor 112 to the I/O interface 132 can oscillate between 6 mA and 24 mA. Consequently, the max of the I/O signal 134 being received at the I/O interface for direct processing by the processing component 130 can be four times the low magnitude or amplitude level. Although a one to four range is disclosed, one of ordinary skill in the art can appreciate that other ranges can also be utilized, such as a one to three range of lows to high signal levels, for example. By implementing the sensor 104 to communicate directly to the micro in a one to four signal level ratio, the processing component 130 can comprise either a CMOS processor or a TTL processor that does not need additional components or elements to further manipulate or alter the I/O signal 134 having the sensor data for processing.

In another embodiment, the current to voltage converter 110, comprises a single resistor or a load resistor 112, which converts the current modulated output signal with the sensor data from the sensor 104 to a voltage modulated signal as the I/O signal 134. The processing component 130 is able to read the I/O signal 134 at the I/O interface 132 and detect the I/O signal 134 directly from the voltage modulated output signal of the load resistor 112. Without further modification of the I/O signal 134 levels, the processor component 130 can further process the sensor data from the I/O signal 134 because the I/O signal 134 is matched with the specifications associated with the I/O interface 132 for reading directly by the processing component 130. The I/O signal 134 is thus to fit within the high and low levels that the processing component 130 is able to process when being receive at the I/O interface 132 directly from the sensor 104.

In addition, the load resistor 112 of the current to voltage converter further operates as a voltage limiting sensor for the I/O signal 134 to be read at the I/O interface 132 within a range of levels that is wider than a one to two ratio, such as a one to four ratio on a consistent basis and being applied directly to the processor component 130. The load resistor 112, operating as a voltage limiting resistor, widens the range of the voltage from the oscillating current modulated signal to provide a mean voltage modulated signal within the range of CMOS or TTL levels at the I/O interface 132 that are acceptable for processing by the processing component 130. The high and low levels of the I/O signal can vary in magnitude in a one to four ratio, or a one to three ratio, for example, in order to match the specifications of the I/O interface 132 directly and be detected by the processing component 130 for further processing without a risk of safety thereto.

In another embodiment, the resistor 112 can be a single resistor or resistor load that is coupled to the second wire 109 (an I/O channel) at a single connect point or connect node 116. The resistor 112 can comprise a first terminal 142 that is connected directly to the I/O channel 109 at the connect node 116 and a second terminal 144 that is connected directly to a ground 114. The resistor 112 can be coupled to the processing component 130 and the sensor 104 in a parallel configuration instead of in a series connection and operate as both a voltage limiting resistor and current to voltage converter. The resistor can have one or more resistances having a fixed or a variable resistance, such as comprising a 100 ohms, 175 ohms, 180 ohms, 200 ohm resistance or another resistance, for example, which can vary depending upon whether the I/O channel or second wire 109 forms the direct connection to the processing component 130 as a CMOS processing component 130 or a TTL processing component 130. Both, processors (CMOS or TTL) can receive signal signals directly and without further modification from the sensor 104 within the system 100. This single resistor can enable the oscillating current modulated output signal to vary between about 6 mA to 24 mA for, example, as the TTL levels or the CMOS levels being directly provided to the processing component 130, in which the processing component 130 is able to directly monitor at the I/O interface 132 as a compatible communication protocol.

Figure 2:
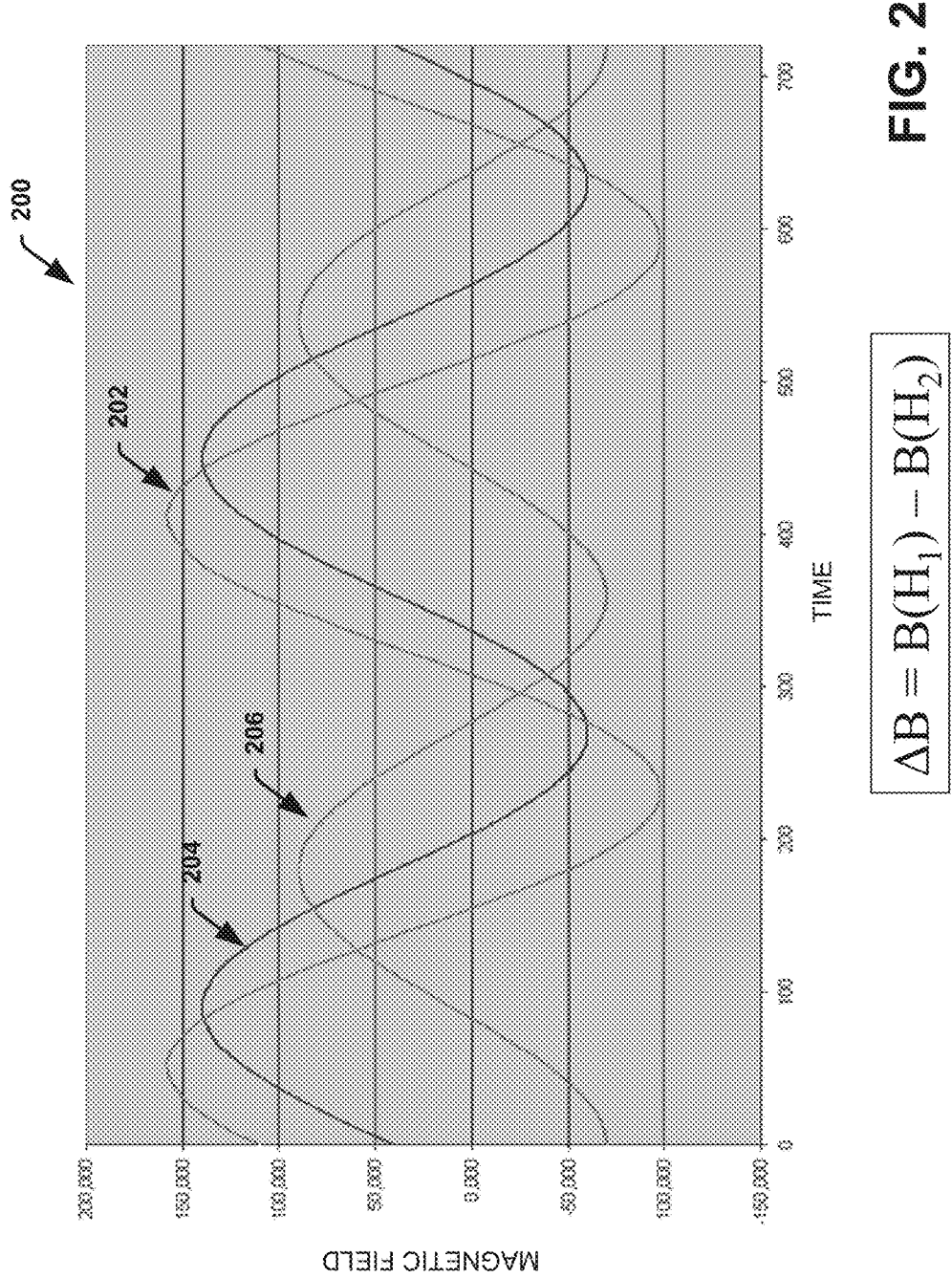
FIG. 2 is a waveform diagram illustrating signals of a current modulated speed sensor of a sensor system in accordance with one or more embodiments.

Referring to FIG. 2, illustrated is a set of example waveforms 200 that can be sensed by the sensor 104 in the system 100 of FIG. 1. For example, the sensor 104 can be a speed sensor such as a magnetic sensor (e.g., a Hall sensor, an MR speed sensor, ABS sensor, or other type sensor). The sensor 104 can have different sensing elements with the wheel or a spinning gear 106. The sensor 104 can take measurements (e.g., B1 and B2) of the wheel 106 or gear, which can be backed by a magnet, or an encoder (not shown) as a ferrite coated piece of rubber alternating north and south poles with the wheel 106. The sensor 104 can have two sensor elements (not shown) monitoring the wheel 106 via a magnetic field applied to the back side to detect peaks and valleys within the wheel 106, with valleys having a less magnetic field density than the peaks. The sensor 104, for example, can monitor the magnetic fields at these different sensor elements (not shown) as a first waveform (B1) 204 and a second waveform B2 206. B1 minus B2 allows a differential field (AB) 202 that is illustrated in FIG. 2 as a differential magnetic output.

The output of the sensor 104 can be generated by one or more components (e.g., current mirror, digital modulator, or the like) that are integrated as part of the sensor 104 on the same board or substrate, which can further modulate the sensor signal to generate a current modulated output signal. The sensor 104 can then provide the current modulated output signal having sensor data directly to the resistor 112 and the processing component 130 without any further modification of the I/O levels for compliance with the processing component 130. Each time a zero crossing (e.g., an imaginary line through the middle of the differential field 202 is a zero crossing) happens, the current output from the sensor 104 can switch between a low peak and a high peak signal level to provide an oscillating modulated output that is constantly between a current range of about 6 mA to about 24 mA with approximately a one to four ratio between the difference between low and high levels. Alternatively, the current range can be a different range (e.g., 3 mA to about 16 mA), or can comprise a different ratio such as one to three, for example.

As stated above, the current modulated output signal of the sensor 104 is provided to the second wire 109 from a differential field of the magnetic fields being sensed in the sensor 104. The current modulated output signal can then be provided via an I/O line directly to the processing component 130 of FIG. 1. The sensor 104 can be external to the processing component as a separate device and not part of the integrated circuit of the processing component 130. With the load resistor 112, an input that is a voltage modulated signal as a voltage mean signal having the sensor data, which can be directly applied to the processing component 130 within the TTL or CMOS levels acceptable for processing. This enables the sensor to directly match, via the load resistor 112, the TTL levels or CMOS levels of the processing component 130 that are specifications specifically associated with the I/O interface 132 (e.g., as an I/O pin).

Referring to FIG. 3, illustrated is a data set 300 of sample input and output TTL and CMOS levels specified for the processing component 130 as a microcontroller (MCU) of FIG. 1. For a TTL MCU at the supply data 302, the TTL low levels can vary from 0 V to about 2 V of the voltage supply 136 (e.g., about 5 V), with about a plus or minus 10% tolerance range (4.5 V to 5.5 V) and the resistance 112 being at about 100 ohms with a minus 10% tolerance range (e.g., about 110 ohms to 90 ohms). For a CMOS MCU at the supply data 304, the CMOS low levels can be from 0 V to 3 V, with about a plus or minus 10% tolerance range (4.5 V to 5.5 V) and the resistance 112 being at about 180 ohms with a minus 10% tolerance range (e.g., about 198 ohms to 162 ohms).

In one embodiment, the resistor 112 of FIG. 1 can operate as a load matching resistor that can be a fixed resistor (e.g., 100 ohms, 180 ohms, or the other resistance) or a variable resistor with a variable resistance between about 100 ohms and 270 ohms or a different range of resistivity. The matching resistor 112 at 100 ohms, for example, is illustrated in the data set 300 for a TTL processor as the processing component 130. The resistor 112 can receive the minimum and maximum levels of the current modulated output signal in current (mA) that is permissible to meet a voltage input range of about 0 to 2 Vin for the minimum and about 4.5 to 5.5 Vin for the maximum in a supply range supply, as illustrated at the data set 300 for a TTL input data 302. The current modulated output signal from the sensor 104 at the resistor 112 at a resistance of about 100 ohms can then be anywhere between about 22 mA to about 61.11 mA, for example, as an input. For the low level, the current modulated output signal can be anywhere from about 0 mA to 7.27 mA. Thus, the current level for the current modulated output signal is recommended and set from the sensor 104 to be from 6 mA to 24 mA. The difference between low and high levels of the current can thus be in one to four ratio, for example, or alternatively other levels can be set such as with a one to three ratio.

This same range can also be operable for a CMOS processor chip as the processing component 130. As shown in the data set 300, input voltage levels are the same or similar as with a TTL processor, but the resistor 112 has been changed to 180 ohms with about a plus or minus 10% tolerance range (e.g., about 198 ohms to 162 ohms). The minimum current output can be about 18.51 mA and the maximum current output can be about 27.76 mA for the high levels, and about 0 mA to 9.25 mA for the low side of current modulated output signal levels. As such, the sensor 104 is operable for both TTL or CMOS processors, or for switching between the two while controlling for the resistance with the resistor 112 as a variable resistor, for example. The sensor 104 directly provides the sensor data to the I/O interface without further manipulation for acceptance by the processor and then subsequent processing. The reason for such acceptance directly is that the distribution between the low levels and high levels both represent a 1 to 4 ratio for acceptable levels of the voltage modulated signal, in which the space or distribution between the low and the high is about four times.

Figures 4, 5:
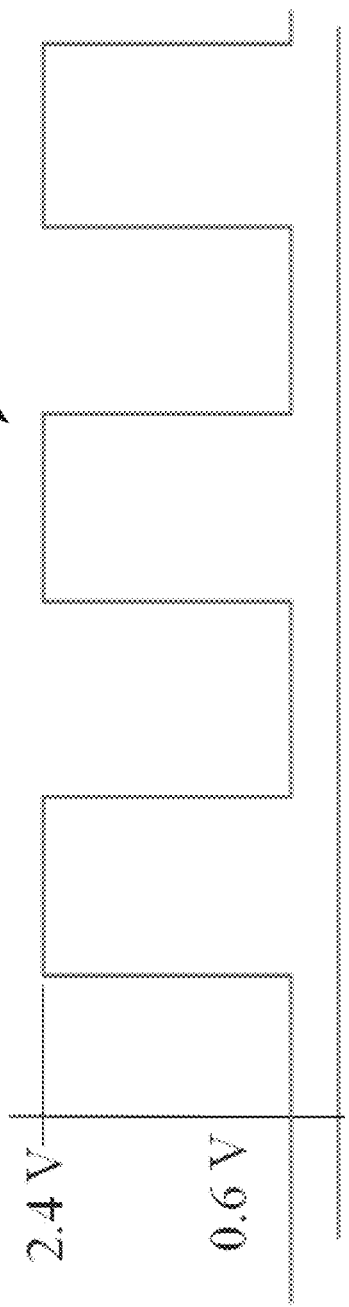
FIG. 4 is another data set illustrating voltage specifications for a sensor system in accordance with one or more embodiments.
FIG. 5 is an example waveform with voltage levels provided to a processor in a direct connection for a sensor system in accordance with one or more embodiments.

As long as the current output levels of the sensor 104 of FIG. 1 are within the ranges discussed above in FIG. 3, then the recommended current range from low to high is 6 mA to 24 mA as a communication protocol for both CMOS and TTL levels of a CMOS and TTL chip as the processing component 130. The reasons for this particular range are illustrated in FIG. 4 where providing 0.6 V to 2.4 V for a 100 ohm resistance for a TTL chip, or 180 ohm resistance for a CMOS chip, can meet the direct requirements for the input levels of the processing component 130 in an oscillating signal 500 as illustrated in FIG. 5. Therefore, the sensor 104 with the current to voltage converter 110 being directly connected to the processor or processing component 130 is able to make the sensors communication palatable to the processing component 130 without having additional components, resistors, comparators voltage dividers or the like for modifying the signal levels.

Referring to FIG. 4, illustrated is another data set 400 of sample input voltage levels that are compatible to TTL and CMOS levels specified for the processing component 130 of FIG. 1. For a CMOS chip as the processing component 130, the level can be ⅓ Vdd for the low level and ⅔ Vdd for the high level, with Vdd being the supply voltage of the processing component 130 from voltage supply 136 of FIG. 1. For a CMOS MCU, the TTL low level can be from 0 V to about 2 V of the voltage supply 136 (e.g., about 5 V), with about a plus or minus 10% tolerance range (e.g., about 110 ohms to 90 ohms). Alternatively, the voltage supply can be another voltage, such as about 3.3 V or other voltage, for example.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

Figure 6:
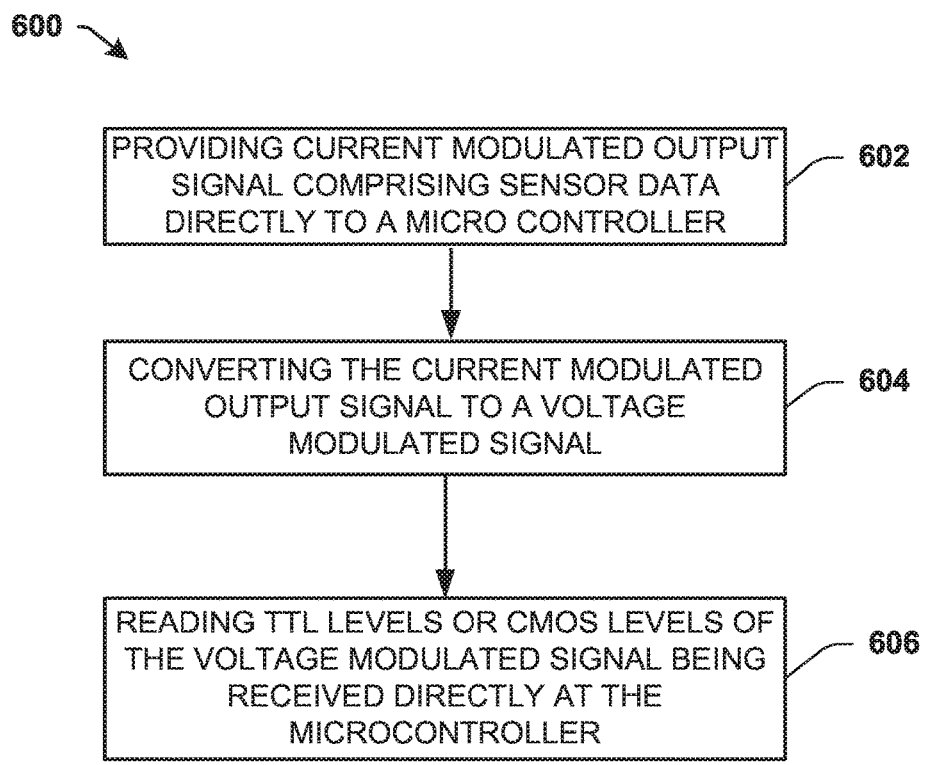
FIG. 6 is an example process flow diagram for a sensor system in accordance with one or more embodiments.

Referring to FIG. 6, illustrated is a method 600 for a sensor system to communicate directly to a microcontroller (e.g., the processing component 130). The method 600 initiates, and at 602 comprises providing a current modulated output signal comprising sensor data from a speed sensor (e.g., sensor 104) directly to an I/O pin (e.g., the I/O interface 132) of the microcontroller 130. The current modulated signal switches between a low and a high range of values (e.g., 6 mA to 24 mA).

At 604, the method comprises converting the current modulated output signal to a voltage modulated signal via a load resistor (e.g., resistor 112) connected to the speed sensor (e.g., the sensor 104) and to the microcontroller 130 at a single contact node 116 along an input/output (I/O) channel 109.

At 606, TTL levels or CMOS levels of the voltage modulated signal being received directly by the I/O pin to process the sensor data are being read by the microcontroller.

In one embodiment, the method 600 can further comprise generating, via the speed sensor, the current modulated output signal comprising the sensor data based on a one to four ratio of a low to a high current modulated output level (signal) or a voltage modulated output signal. Alternatively or additionally, the current modulated output signal comprising the sensor data can be generated based on a one to three ratio of a low to a high current modulated output level. I/O levels of the microcontroller are thus matched via the load resistor being coupled to a ground and connected in parallel to the speed sensor and the microcontroller to enable the microcontroller to read the sensor data directly from the I/O pin of the microcontroller. At discussed above, the speed sensor or other current sensor can comprise a Hall speed sensor configured as a two-wire sensor that receives an independent supply voltage from one wire and provides the sensor data directly to the I/O pin along another wire as an I/O channel.

Referring to FIG. 6, illustrated is another example of a sensor system in accordance with various aspects. The sensor system 700 is similar in operation and structure as the sensor system 100 described above with regard to FIG. 1. The sensor system 700 further comprises a plurality of microprocessors as a CMOS component 704 and a TTL component 706, for example, that are coupled to a switching component 702. The sensor system 700 can be implemented in any number of different systems that have a need for different types of processors including TTL processors or CMOS processors. One of ordinary skill in the art will appreciate that the processors 704 and 706 can be the same type of processors, such as CMOS or TTL, or comprises different processors as CMOS and TTL processors as illustrated. Various advantages can be implemented by having a CMOS processor or a TTL processor as part of the sensor system 100.

In addition, although the switching component 702 is provided, different architectures are also envisioned by one of ordinary skill in the art and are not limited the architectures provided for explanation herein. For example, where all the processors are the same, the switching component 702 could be removed and the resistor 112 of the current to voltage converter 110 can be a fixed resistor.

Figure 7:
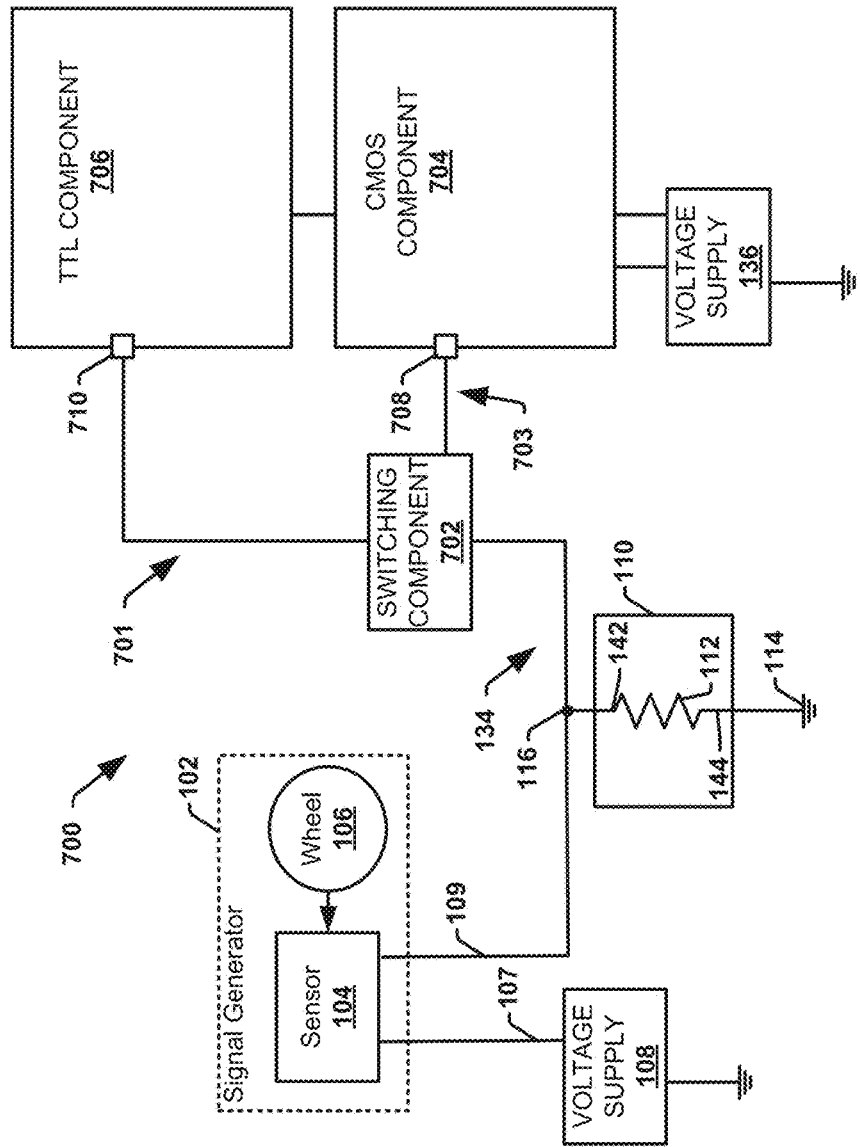
FIG. 7 is another block diagram illustrating a sensor system in accordance with one or more embodiments.

In the example of FIG. 7, the resistor 112 can be a variable resistor that is varied based on whether the CMOS component 704 or the TTL component 706 is activated or switched to by respective connections 701 or 703 to each of these processing components. The resistor 112 can be passively controlled or actively controlled based on one or more design parameters or criteria implemented by the CMOS component 704, the TTL component 706, or other processing device, for example. In response to the CMOS component 704 being activated or utilized via connect 703 connecting the sensor generator 102 thereto, the resistor 112 can be varied to an optimal resistance, such as 180 ohms. The sensor system then operates to provide sensor data via a current modulated output signal and a voltage modulated output signal according to the range and level specifications discussed with regard to the CMOS data set 304 of the data set 300 of FIG. 3.

Alternatively or additionally, in response to the TTL component 704 being activated or utilized via connect 601 connecting the sensor generator 102 thereto, the resistor 112 can be varied to an optimal resistance, such as 100 ohms. The sensor system then operates to provide sensor data via a current modulated output signal and a voltage modulated output signal according to the range and level specifications discussed with regard to the TTL data set 302 of the data set 300 of FIG. 3.

The switching component 702 can comprise any number of switching mechanisms and is not limited to any one configuration of switches or particular switch elements. The switching component 702 can be dynamically controlled based on the desired criteria of the system implementing the sensor system 600, or set based on a predetermined operational schedule. For example, the switching component can receive a signal and further activate or switch the connection 708 or 710 in order for the sensor data of a the current modulated output signal of the sensor 104 to directly connect to the respective CMOS component 704 or TTL component 706 without any additional modification of the sensor levels discussed herein to be read or processed.

CMOS components are typically more expensive than TTL equivalents. However, CMOS technology is usually less expensive on a sub-system level due to CMOS chips being smaller and requiring less regulation. In addition, CMOS circuits do not draw as much power as TTL circuits while at rest. However, CMOS power consumption increases faster with higher clock speeds than TTL does. Lower current draw requires less power supply distribution, therefore causing a simpler and cheaper design. Additionally, CMOS components can be more susceptible to damage from electrostatic discharge than TTL components Although the disclosure has been shown and described with respect to one or more implementations, equivalent alterations and modifications will occur to others skilled in the art based upon a reading and understanding of this specification and the annexed drawings. For example, although I/O signals have been discussed in some examples above in the context of automotive applications, CMOS and TTL applications, or otherwise, it will be appreciated that I/O signals can relate to practically any type of signal, including timer output signals and communication signals (e.g., SPI lines, UART outputs, CAN lines, etc.) The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. A sensor system, comprising:
   a memory unit configured to store operating instructions;
   a processing component coupled to the memory unit, wherein the processing component is configured to execute logical operations corresponding to respective operating instructions, wherein the memory unit and the processing component are disposed on a CMOS integrated circuit (IC) or a TTL IC;
   a sensor located external to the CMOS IC or the TTL IC and directly connected to an input/output (I/O) interface of the CMOS IC or the TTL IC, the sensor comprising a current source configured to provide a current modulated output signal that comprises sensor data to the CMOS IC or the TTL IC based on a physical property sensed by the sensor; and
   a current to voltage converter, connected to the sensor and the processing component via a direct connection at a single contact node, the single contact node being located between the I/O interface and the current source so that the sensor is directly connected to the I/O interface of the processing component and to the single contact node, the current to voltage converter comprising a switchable load resistor configured to convert the current modulated output signal to an I/O voltage signal at the I/O interface that comprises the sensor data, and TTL levels or CMOS levels of the I/O voltage signal depending on a switching state of the switchable load resistor, and provide the I/O voltage signal to the I/O interface of the CMOS IC and the TTL IC based on the switching state, wherein the current to voltage converter is separate from and external to the processing component and the sensor;
   wherein the processing component is further configured to receive and process sensor data related to the physical property directly from the I/O voltage signal at the I/O interface to generate an output.

2. The sensor system of claim 1, wherein the sensor coupled to the current to voltage converter component is further configured to provide the current modulated output signal to the I/O interface based on a one to four modulation ratio between a high and a low of an oscillation of the current modulated output signal.

3. The sensor system of claim 1, wherein the current to voltage converter is further configured to match I/O levels of the processing component to enable the processing component to read the sensor data directly from an I/O pin of the I/O interface, and further configured to provide the I/O voltage signal to the I/O interface of the CMOS IC and the TTL IC based on the switching state of the switchable load resistor and a state of a switching component coupled to the I/O interface and the current source for providing the direct connection at the single contact node.

4. The sensor system of claim 3, wherein the current to voltage converter is further configured to match the I/O levels comprising TTL processor levels and CMOS processor levels that enable one or more processors of the CMOS IC and the TTL IC to directly receive and read the sensor data from the I/O voltage signal at the I/O interface of the CMOS IC and the TTL IC, and configure the I/O pin of the I/O interface with the TTL levels and the CMOS levels based on the switching state of the switchable load resistor and the state of the switching component.

5. The sensor system of claim 1, wherein the load resistor is connected in parallel to the sensor and the processing component of the CMOS IC or the TTL IC, and is connected to a ground.

6. The sensor system of claim 1, wherein the sensor comprises a speed sensor configured as a two-wire sensor that receives an independent supply voltage on a first wired connection and provides the current modulated output signal to the load resistor and the CMOS IC or the TTL IC external to the sensor.

7. The sensor system of claim 1, wherein the processing component is further configured to receive the I/O voltage signal on an I/O pin of the I/O interface of the CMOS IC or the TTL IC, and wherein the load resistor is further configured to enable a widened range of a voltage mean modulated output signal, and enable the processing component to directly read the sensor data at the I/O pin of the I/O interface.

8. The sensor system of claim 1, wherein the sensor comprises at least one of a Hall sensor, a tunnel magnetoresistance (TMR) sensor, a magnetoresistive (MR) sensor, and a giant magnetoresistance (GMR) sensor configured to provide the current modulated output signal to the CMOS IC or the TTL IC.

9. A method for a sensor system to communicate directly to a microcontroller, the method comprising:
providing a current modulated output signal comprising sensor data from a current source of a speed sensor directly to an input/output (I/O) pin of an integrated circuit of the microcontroller, wherein the current modulated signal switches between a low and a high range of values;
converting the current modulated output signal to a voltage modulated signal comprising TTL levels, or CMOS levels, via a switchable load resistor connected to the speed sensor and to the integrated circuit of the microcontroller at a single contact node along an input/output (I/O) channel, the single contact node being located between the I/O interface and the current source so that the speed sensor is directly connected to the I/O interface of the integrated circuit and to the single contact node, and the switchable load resistor is separate from and external to the integrated circuit and the speed sensor; and
reading the TTL levels or the CMOS levels of the voltage modulated signal depending on a switching state of the switchable load resistor, wherein the TTL levels or the CMOS levels of the voltage modulated signal are configured to be received directly by the I/O pin to process the sensor data by the microcontroller directly therefrom.

10. The method of claim 9, further comprising:
generating, via the speed sensor, the current modulated output signal comprising the sensor data based on a one to four ratio of a low to a high current modulated output level.

11. The method of claim 9, further comprising:
generating, via the speed sensor, the current modulated output signal comprising the sensor data based on a physical property and a one to three ratio of a low to a high current modulated output level.

12. The method of claim 9, wherein the reading of the TTL levels or the CMOS levels of the voltage modulated signal being received by the I/O pin directly further comprises processing the sensor data by a TTL processor or CMOS processor as the microcontroller from the I/O pin.

13. The method of claim 9, further comprising:
matching I/O levels of the microcontroller via the load resistor being coupled to a ground and in parallel to the speed sensor and the microcontroller to enable the microcontroller to read the sensor data directly from the I/O pin of the microcontroller.

14. The method of claim 9, wherein the speed sensor comprises a Hall speed sensor configured as a two-wire sensor that receives an independent supply voltage from one wire and provides the sensor data directly to the I/O pin along another wire as an I/O channel.

15. A sensor system, comprising:
a CMOS chip, or a TTL chip, of an integrated circuit, configured to receive an input/output (I/O) signal at an I/O interface of the integrated circuit and process sensor data from the I/O signal at the I/O interface directly based on CMOS levels or TTL levels of the I/O signal; and
a speed sensor, coupled directly to the CMOS chip or the TTL chip via an I/O channel, comprising a current source configured to provide a current modulated output comprising the sensor data to a current to voltage converter that is connected to the speed sensor and the integrated circuit via a direct connection at a single contact node, the single contact node being located between the I/O interface and the current source comprising a switchable resistor so that the speed sensor is directly connected to the I/O interface of the integrated circuit and to the single contact node, wherein the switchable resistor is separate from and external to the integrated circuit and the speed sensor;
wherein the switchable resistor is configured to convert the current modulated output to an input/output (I/O) voltage signal having a low and a high within a range of the CMOS levels or the TTL levels depending on a switching state of the switchable resistor and provide the voltage signal directly to the I/O interface as the I/O signal.

16. The sensor system of claim 15, wherein the resistor comprises a voltage limiting resistor that is connected to the speed sensor and to the CMOS chip or the TTL chip directly at a single connection.

17. The sensor system of claim 16, wherein the resistor is further connected to a ground with a different connection than the single connection.

18. The sensor system of claim 15, wherein the low and the high of the range differ in magnitude by a ratio of about one to four.

19. The sensor system of claim 15, wherein the speed sensor comprises two wired connections comprising a first wired connection coupled to an independent supply voltage and a second wired connection directly connected to an I/O pin of the I/O interface of the CMOS chip or the TTL chip, wherein the CMOS chip or the TTL chip is coupled to a different independent supply voltage that is different from the independent supply voltage.

20. The sensor system of claim 15, wherein the resistor is further configured to widen the range of a voltage mean modulated output and enable the CMOS chip or the TTL chip to directly read the sensor data at the I/O interface.

\* \* \* \* \*